(12) United States Patent
Bailey (10) Patent No.: US 11,692,647 B2
(45) Date of Patent: Jul. 4, 2023

(54) AUTOMATIC TIE-ROD APPARATUS

(71) Applicant: Three G's Automation LLC, Cumming, GA (US)

(72) Inventor: Michael Bailey, Cumming, GA (US)

(73) Assignee: THREE G'S AUTOMATION LLC, Cumming, GA (US)

( * ) Notice: Subject to any disclaimer, the term of this patent is extended or adjusted under 35 U.S.C. 154(b) by 141 days.

(21) Appl. No.: 17/198,654

(22) Filed: Mar. 11, 2021

(65) Prior Publication Data

US 2021/0285568 A1 Sep. 16, 2021

Related U.S. Application Data

(60) Provisional application No. 62/989,173, filed on Mar. 13, 2020.

(51) Int. Cl.
*B26D 7/00* (2006.01)
*B21C 37/04* (2006.01)
*F16L 3/00* (2006.01)

(52) U.S. Cl.
CPC ............ *F16L 3/006* (2013.01); *B21C 37/045* (2013.01); *B26D 7/0006* (2013.01)

(58) Field of Classification Search
CPC ..... F16L 3/006; B21C 37/045; B26D 7/0006; B21D 43/285; B21F 23/005
See application file for complete search history.

(56) References Cited

U.S. PATENT DOCUMENTS

2009/0114421 A1* 5/2009 Swift ..................... H01C 7/005
29/877

* cited by examiner

*Primary Examiner* — Rick K Chang
(74) *Attorney, Agent, or Firm* — Grogan, Tuccillo & Vanderleeden, LLP (57) ABSTRACT

A tie rod forming apparatus includes a frame for supporting a material holding unit that releasably holds tie rod stock material, and a feed bed in structural communication with the material holding unit. The feed bed selectively accepts and manipulates the tie rod stock material. A cutting assembly is provided in operative communication with the feed bed, and an operator interface module is in communication with the material holding unit and the cutting assembly. The material holding unit selectively dispenses the tie rod stock material to the feed bed, and the cutting assembly manipulates a portion of the dispensed tie rod stock material, in dependence upon parameters communicated by the operator interface module.

9 Claims, 11 Drawing Sheets

Rods Cut List

Project: ABC
Job Name: Tie Rods
Job Description:
Account #:
Download #: 3

GALVANIZED

| 1/2" EMT | Length | Qty |
|---|---|---|
| | 49.00 | 1 |
| | 47.00 | 6 |
| | 38.50 | 4 |
| | 37.00 | 8 |

Project: ABC
Job: 422,Tie Rods
Version 2019.1.1
3-3-2020, 9:36 AM
Page 1 of 1

FIG. 11

AUTOMATIC TIE-ROD APPARATUS

CROSS-REFERENCE TO RELATED APPLICATIONS

This application claims the benefit of U.S. Provisional Application Ser. No. 62/989,173, filed on Mar. 13, 2020, which is hereby incorporated by reference herein in its entirety.

FIELD OF THE INVENTION

The present invention refers, generally, to an automatic tie-rod apparatus, and more specially to a tie rod production and formation apparatus that is capable of storing a quantity of tie rod stock material, for selective feeding to a feed bed and cutting assembly, all in dependence upon design parameters for a given endeavor, as communicated to and by an integrated control system.

BACKGROUND OF THE INVENTION

In the air-handler industry large metal ducts are often fabricated by taking ordinary sheet metal stock and bending it to shape on-site according to architectural plans and specifications further restricted by the realities of the job site. The formed air ducts are often of various lengths as it is necessary to fabricate and join multiple duct sections together to form a complete air handling or HVAC system. This joining entails the use of custom lengths, geometries, and joints. The ducts are often hung from ceilings, installed in walls, and may also serve as a free standing bridge to other air handling equipment.

To ease installation of the ducts and duct sections, a number of hang points, straps, or other connective devices are used to hang and stabilize the ducts into an installed configuration. As duct sections are combined and connected to powered air handling equipment vibrations are conducted through the sheet metal walls forming the bulk of the body of the ductwork. The vibrations may arise from the oscillations of fans and blowers, from exterior vibrations conducted through the building superstructure (e.g., wind, traffic, movement of occupants, etc.) or from any other sources. Unchecked, the vibrations can lead to the failure of joints, hangers, and ultimately, the complete or partial failure of the HVAC system.

Tie-rods are attached to ducts at least to control vibrations or to provide structural reinforcement. Often, the tie-rods are fabricated and attached to ducts on-site. Fabrication and attachment are often accomplished through the use of hand tools with raw stock material requiring on the fly measurement, marking, and cutting. In addition to the risks inherent with the operation of hand tools the lack of material and resource management capabilities leads to wastage of materials that could otherwise be conserved. Thus, there is need for an apparatus to minimize operator exposure to cutting and fabricating processes while simultaneously minimizing material wastage.

BRIEF SUMMARY OF THE INVENTION

A tie rod apparatus may comprise a superstructure supporting a feed bed, cutting and polishing assembly, feed drive assembly, a command and power module, stock managing unit, and an operator interface module.

DETAILED DESCRIPTION OF THE INVENTION

Although described in the context of a tie-rod machine, those skilled in the art can readily appreciate that the capabilities of the described invention are transferrable to many other devices and may be adapted to such other purposes as pipe-fitting, conduit splicing, and other circumstances where there is a need to manage customized consumable inventory stocks.

"Tie rod" as used herein refers to the reinforcement stock commonly used in the HVAC field. Skilled artisans can easily appreciate that tie rod raw stock material may take many forms, shapes, and be made of any suitable material. A tie rod may be attached to any intermediate angle, channel, or zee and may be used to reinforce a joint. Tie rods may be attached to ducts by any of a multiplicity of means such as welding, bolting, riveting, or screwing. Although termed a "rod," such as a solid cylinder of material, a "tie rod" may further be a tube, pipe, conduit, reinforced sheet, wire, braided material, solid, hollow, or angle. Tie rods may be structural components of the ducts and may also be used as part of the suspension system for ducts. Duct dimensions and material characteristics (type, thickness, electrochemistry, etc.) in addition to operating pressures define tie rod length, size and shape. Tie rods may be installed internal or external to the duct and may run parallel or perpendicular to the overall run direction of the duct. Tie rod ends may additionally be threaded and socketed for joining together or may be cut ends or polished ends.

Figure 1:
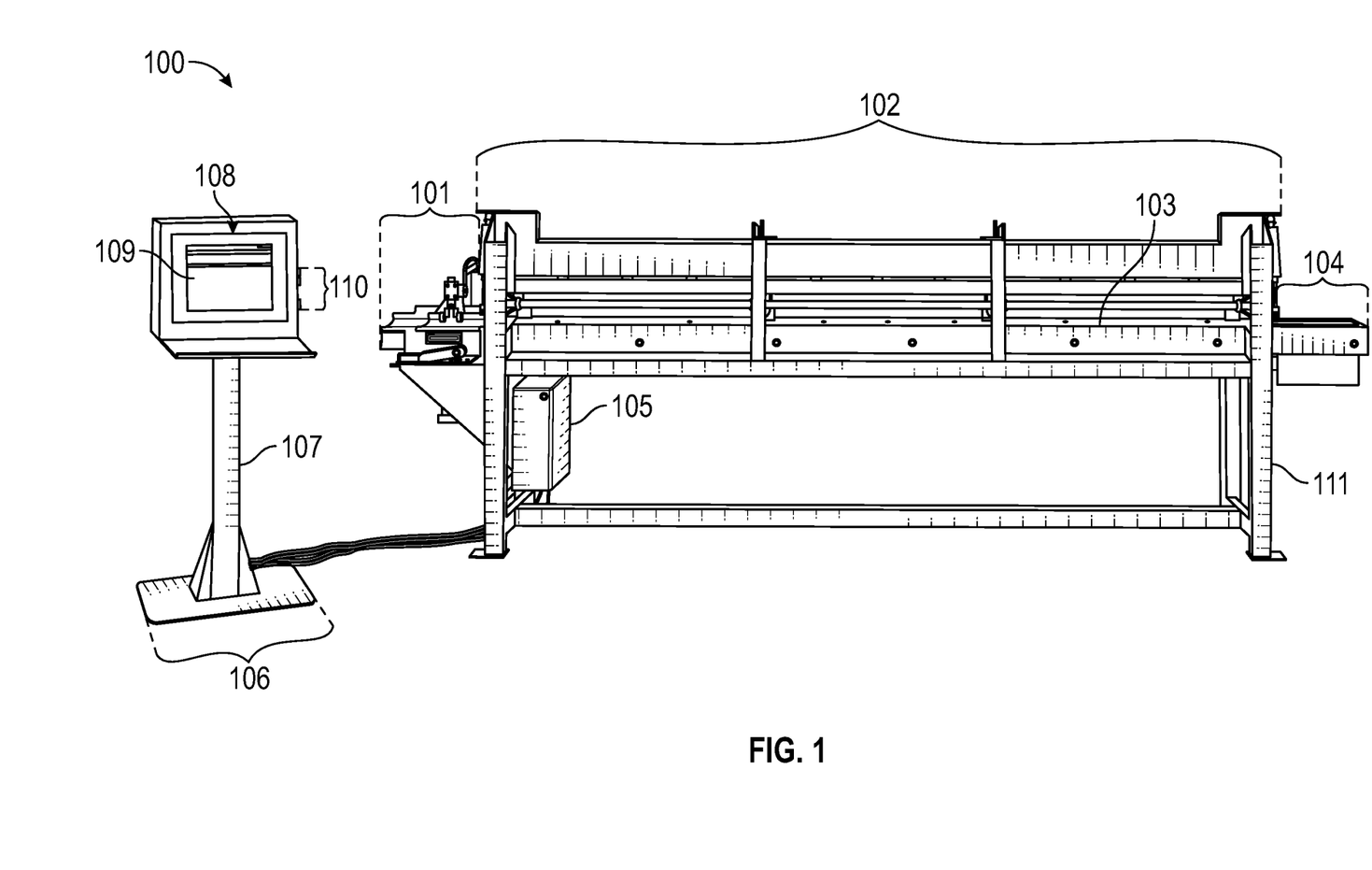
FIG. 1 illustrates an overview of the major components an embodiment of the invention.

FIG. 1 illustrates an overview of an example tie-rod apparatus 100. Visible are cutting and polishing assembly 101, stock managing unit 102, feed bed 103, feed drive assembly 104, command and power module 105, and operator interface module 106. In this example embodiment, operator interface module 106 is a stand-alone structure with a support stand 107 supporting a user interface module 108 containing a display 109, and switches 110. Display 109 may also double as a user input device when configured as a touch-screen display. User interface module 108 is operatively connected to command and power module 105 which is mounted to superstructure 111. Superstructure 111 supports cutting and polishing assembly 101, stock managing unit 102, feed bed 103, and feed drive assembly 104. In operation, stock managing unit 102, is configured to maintain an inventory of tie rod raw stock material. One or more pieces of raw stock material is transferred from stock managing unit 102 to feed bed 103. Driven by feed drive assembly 104, feed bed 103 is configured to receive the tie rod stock material, align the raw tie rod stock material with cutting and polishing assembly 101 and then feed the tie rod stock material into cutting and polishing assembly 101. Stock managing unit 102 may be integrated into superstructure 111 or may be an independent, modular, component that is removably attached to superstructure 111.

Figure 2:
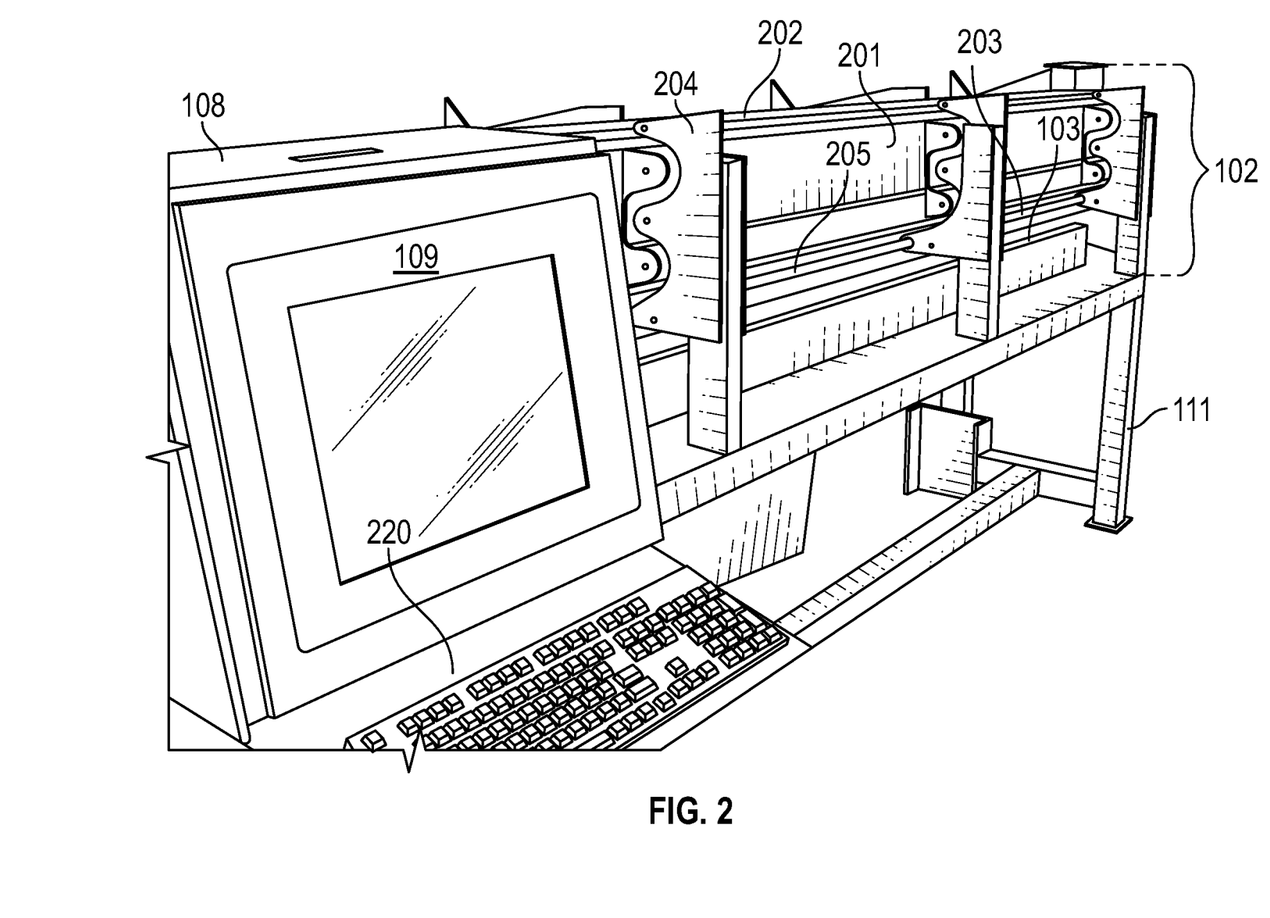
FIG. 2 illustrates an offset view of a subsection of an embodiment of the invention.

FIG. 2 illustrates an offset view of a subsection of an embodiment of the invention. Visible is stock managing unit 102, feed bed 103, user interface module 108 with display 109, and superstructure 111. Stock managing unit 102 is equipped with side shrouds 201, upper side support 202, and lower side support 203 mounted to the stock managing unit superstructure 204. Central rod 205 is mounted to the stock managing unit superstructure 204 and runs the length of the stock managing unit 102 above and parallel to feed bed 103.

User interface module 108 may further comprise (not shown): a processor, a memory device for storing program code or other data; display device 109 as described above; and one or more input device interfaces such as keyboard 220 and switches 110 (shown in FIG. 01). The system may further comprise: a sound output system comprising a sound card, speakers, headphone jack, and other means to drive sound output; one or more video cards configured to drive at least one display, and additional display units.

The processor is typically a microprocessor or microcontroller-based platform which is capable of displaying images on display device 109. The memory device can include random access memory (RAM) for storing event data or other data generated or used during a particular game. The memory device can also include read only memory (ROM), or other non-transitory computer-readable media configured to store program code which controls stock managing unit 102, feed drive unit 104, and the cutting and polishing assembly 101.

It should be appreciated that although a processor and memory devices are possible implementations, further embodiments can also be implemented using one or more application-specific integrated circuits (ASIC's) or other hard-wired devices, or using mechanical devices (collectively, and/or individually referred herein as a "processor"). Furthermore, although the processor and memory device in certain embodiments reside in user interface module 108, it is possible to provide some or all of their functions in command and power module 105 or from an off-site device such as a network server for communication to a playing station such as over a local area network (LAN), wide area network (WAN), Internet connection, microwave link, and the like. The processor and memory device are generally referred to as a "computer" or "controller."

Input devices, such as keyboard 220 and switches 110 (shown in FIG. 01) can include additional physical buttons and controllers such as joysticks, mice, and similar controllers. Further, an input device can include specialized devices such as RFID and contactless readers configured to operatively communicate with other control devices. Physical buttons may be symbolically represented on display device 109 configured to display input information. As mentioned above, display device 109 may further be configured to directly accept input from a user, as in a touch screen device or infrared screen overlay device. In further embodiments, additional value data may be obtained from a networked device configured to obtain value data and provide it to a processor.

In operation the memory device contains computer readable instructions to configure the controller to receive inventory data via the user inputs and to generate a cut list such as the example provided in FIG. 11 (further described below). The controller is then configured to activate the stock managing unit. The stock managing unit releases a predetermined amount of tie rod stock material which is then transported via the feed bed to the cutting and polishing assembly. The tie rod stock is then automatically cut according to the cut list with the ends subsequently finished as specified. The user interface module display 109 is configured to alert a user to perform the next steps in the cutting operation.

Figure 3:
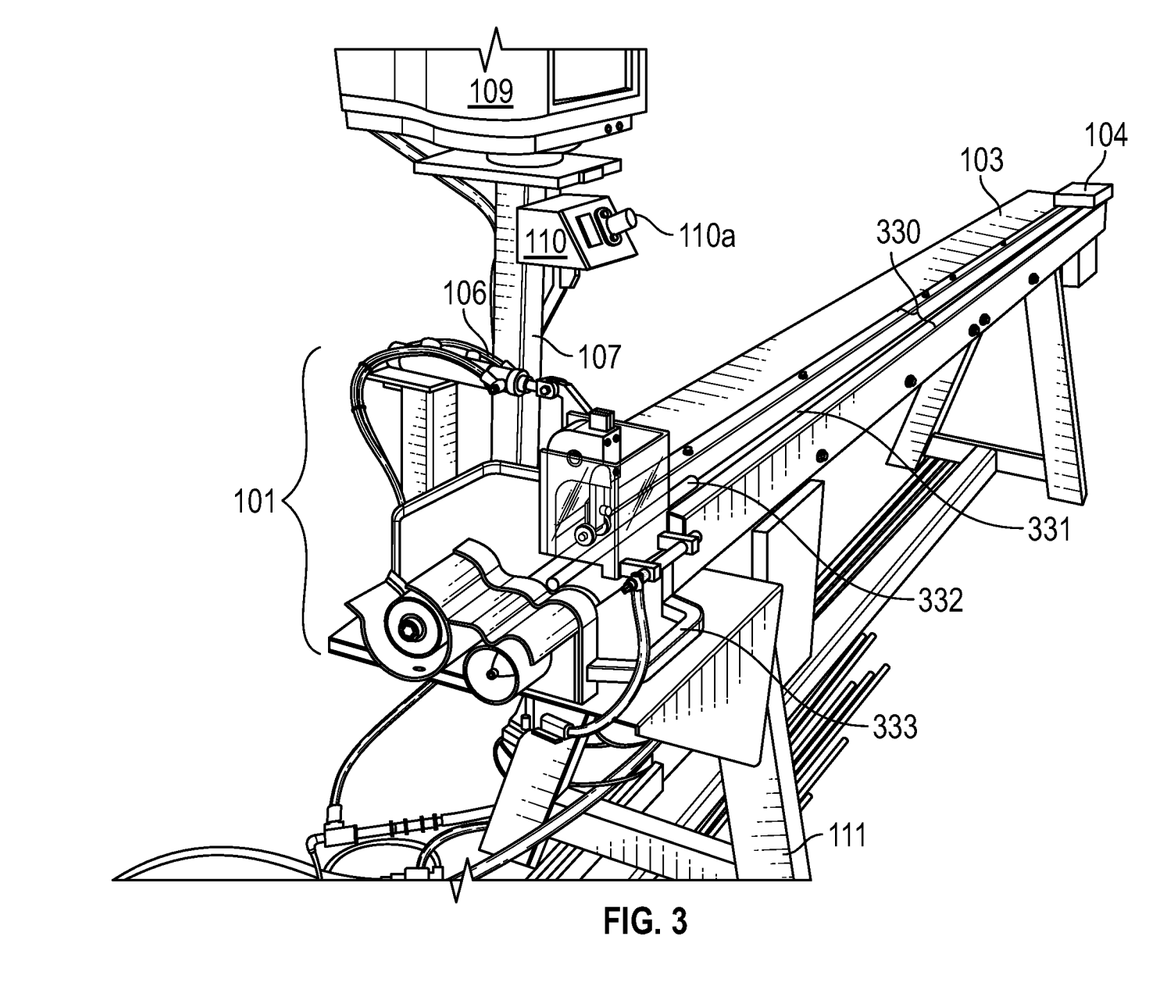
FIG. 3 illustrates an offset view of a subsection of an embodiment of the invention.

FIG. 3 illustrates an offset view of a subsection of an embodiment of the invention. In this embodiment, stock managing unit 102 is removed. Support stand 107 of operator interface module 106 is integrated into superstructure 111. Display 109 and switches 110 are integrated onto the support stand 107. One of switches 110 is configured to serve as an emergency cutoff switch 110a the activation of which will cease all functioning of the tie rod apparatus. Feed bed 103 is in an open configuration with material handling groove 330 containing material feeder 331 interfaced with feed drive assembly 104 and feeding a tie-rod 332 into cutting and polishing assembly 101. Skilled artisans may readily appreciate, however, that the feed bed 103 may be shrouded. Cutting and polishing assembly 101 further contains a handle 333 allowing an operator to remove the cutting and polishing assembly 101 from superstructure 111.

Superstructure 111 is further configured to allow detachment of operator interface module 106, stock managing unit 102, feed bed 103, and feed drive assembly 104. Individual frame members of superstructure 111 may further disassemble into superstructure sub-components (not shown) to allow for greater ease of transport. It is further appreciated that cutting and polishing assembly 101 may be exchanged for identical or similar modules performing similar but utilizing cutting methods and sensors of different type (e.g., exchanging a wheel cutter for a torch, saw, etc.). Thus, cutting and polishing assembly 101 may be further adapted to a specific type of tie-rod material, geometry, etc. without necessitating an entirely new apparatus. Portability of the apparatus as a whole is increased as modular parts allow for less volume required for transport and less effort expended by workers moving smaller pieces.

Figure 4:
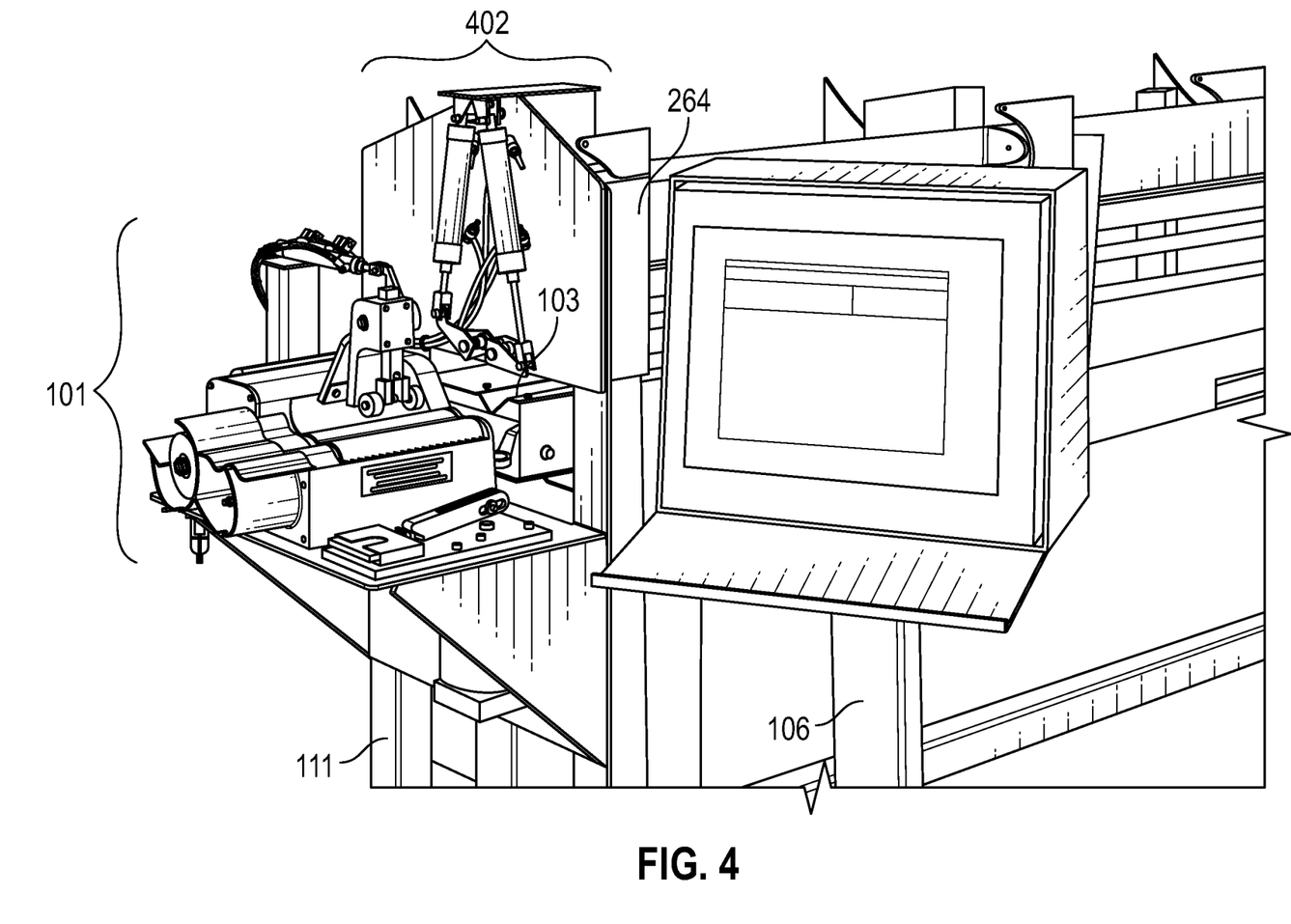
FIG. 4 illustrates an offset view of a subsection of an embodiment of the invention.

FIG. 4 illustrates an offset view of a subsection of an embodiment of the invention. Operator interface module 106 is presented as independently positioned from the superstructure 111. Stock managing unit superstructure 204 is integrated with superstructure 111. Stock managing unit endpiece 402 is illustrated at the end of feed bed 103 prior to cutting and polishing assembly 101.

Figure 5:
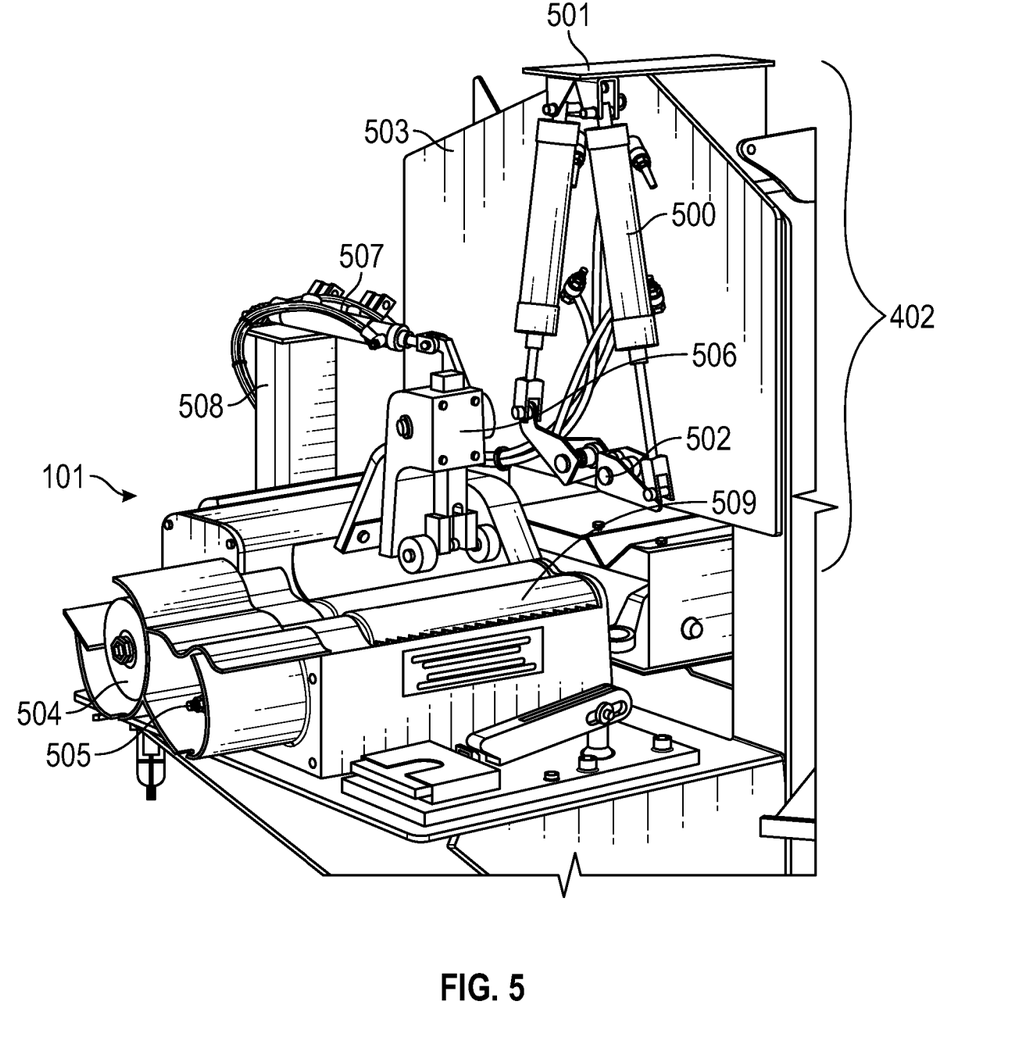
FIG. 5 illustrates an offset view of a subsection of the embodiment of the invention also shown in FIG. 4.

FIG. 5 illustrates an offset view of a subsection of the embodiment of the invention also shown in FIG. 4. Stock managing endpiece 402 comprises pneumatic pistons 500 attached to end plate 501 and attached to drive pivots 502 mounted through end shroud 503. Pistons 500 may also be hydraulic or electronic actuators. Pistons may be removably or fixedly attached to end plate 501. Triggering of pistons 500 trips drive pivots 502 to cause the movement of tire-rod raw stock inventory from stock managing unit 102 to feed bed 103.

Cutting and polishing assembly 101 as illustrated in this embodiment is configured to cut cylindrical tie-rod raw stock. Visible is polishing wheel 504 and deburring wheel 505. Those skilled in the art can readily appreciate that these items may be interchanged for elements performing similar functions, for example, a sanding or grinding wheel to polish ends of flat or angle tie rod stock. Cutting and polishing assembly 101 further comprises cutting assembly 506, cutting drive actuator 507, cutting drive actuator mount 508, and cutting bed 509.

Figure 6:
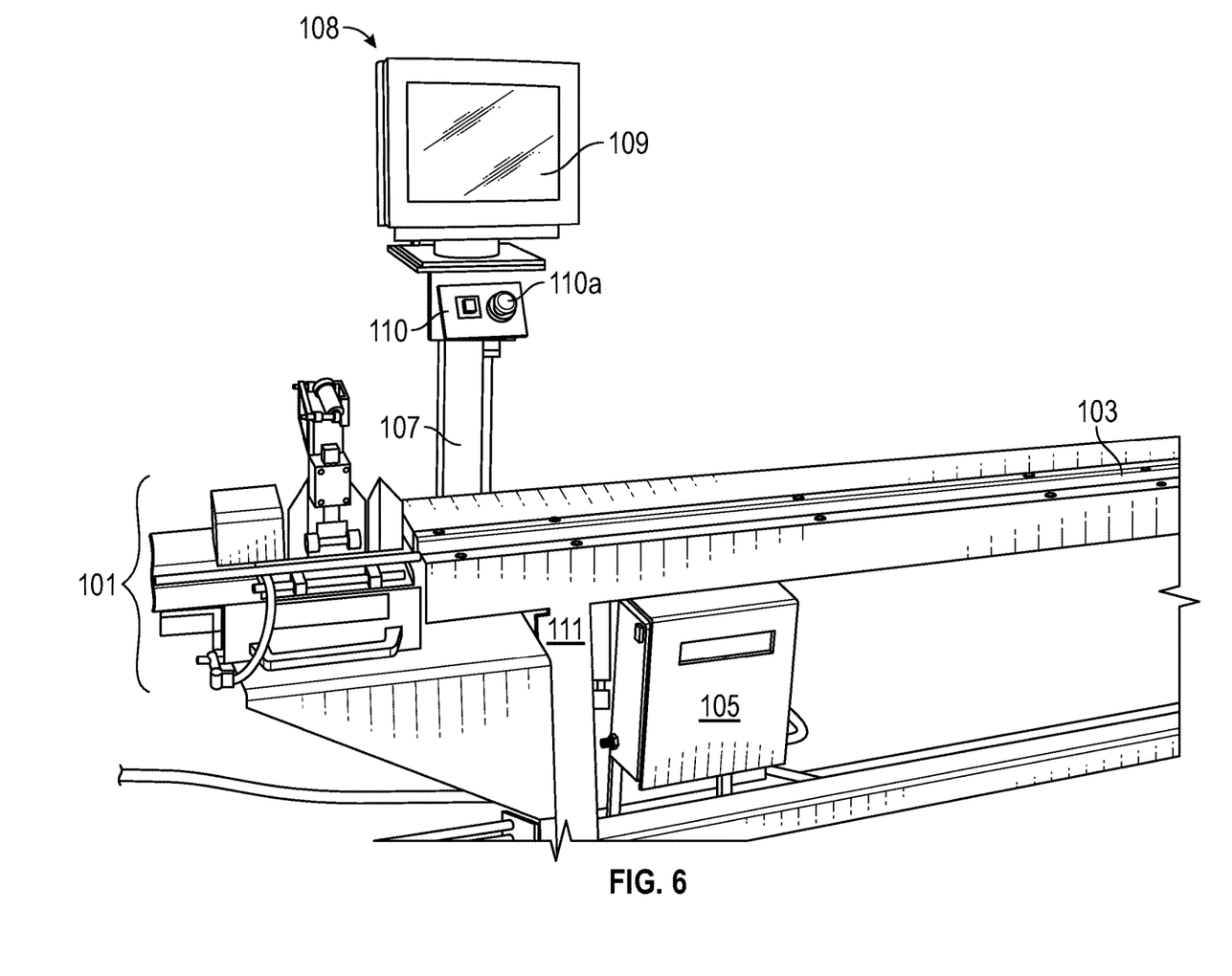
FIG. 6 illustrates an offset view of a subsection of an embodiment of the invention also shown in FIG. 3.

FIG. 6 illustrates an offset view of a subsection of an embodiment of the invention also shown in FIG. 3. As above cutting and polishing assembly 101 is mounted to superstructure 111 which is also integrated with operator interface module 106 via support stand 107 further supporting user interface module 108 with display 109 and switches 110 including emergency cutoff switch 110*a*. Command and power module 105 is mounted below feed bed 103. Command and power module 105 is further equipped with electrical relays, communications busses, a controller, a memory device, and may be configured to trigger individual machine actions in response command inputs received from user interface module 108.

Figure 7:
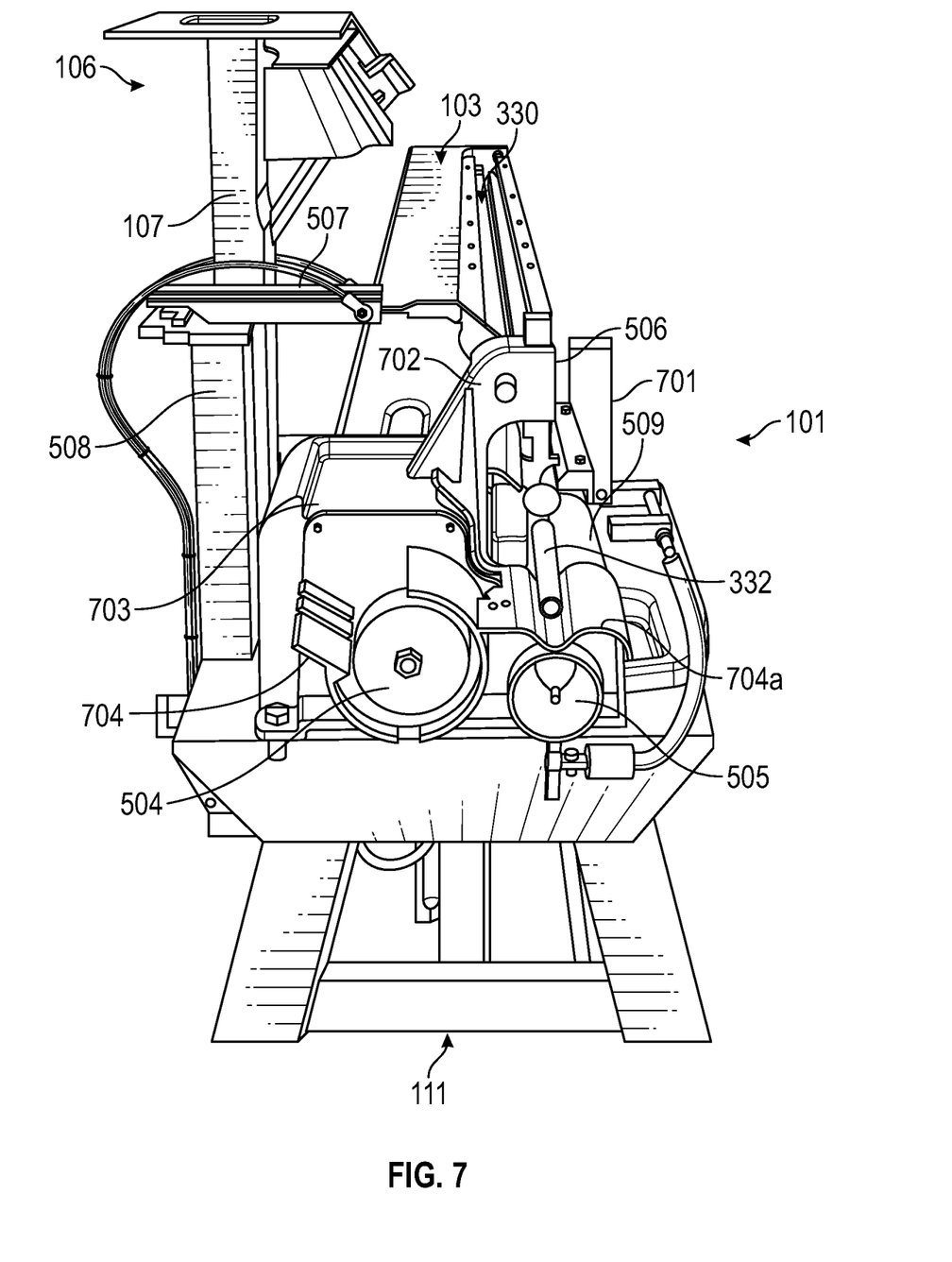
FIG. 7 illustrates an offset end view of a subsection of an embodiment of the invention also shown in FIGS. 3 and 6.

FIG. 7 illustrates an offset end view of a subsection of an embodiment of the invention also shown in FIGS. 3 and 6. Superstructure 111 supports operator interface module 106 via support stand 107. Feed bed 103 with material handling groove 330 is aligned with cutting and polishing assembly 101. Cutting assembly 506 is configured to cut tie rod 332 which, in this case, is a piece of conduit. Cutting assembly 506 further comprises shield 701, cutting tool mounting arm 702 which in this embodiment is integrated into cutting assembly housing 703. Cutting assembly housing 703 has polishing wheel 504 and deburring wheel 505 mounted through it and surrounded by protective wheel guard 704 the upper portion of which 704*a* forms an exit pathway for cutting bed 509. Cutting drive actuator mount 508 is shown similarly integrated into superstructure 111 and supporting cutting drive actuator 507 of cutting assembly 506.

Figure 8:
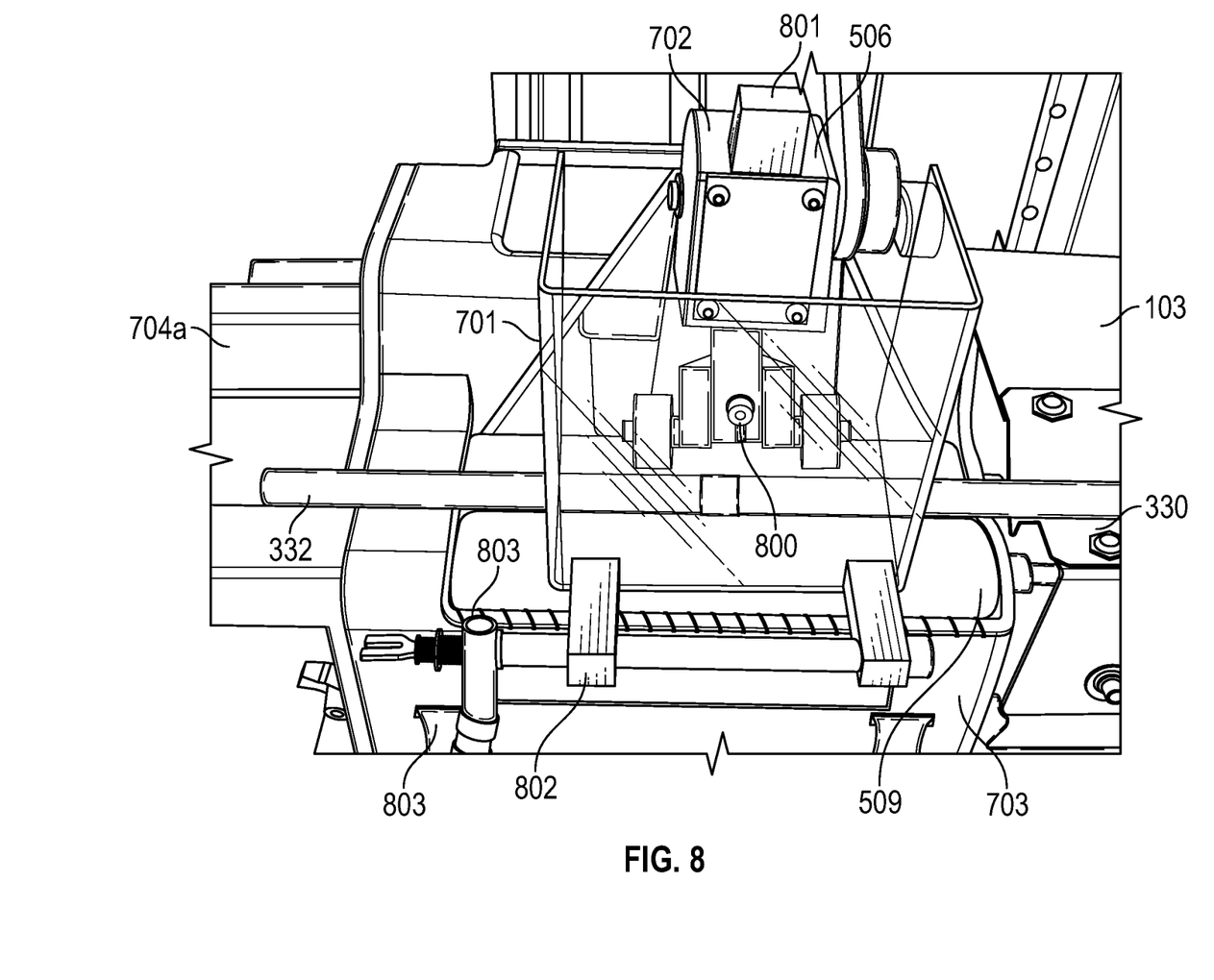
FIG. 8 illustrates a detail view of a subsection of an embodiment of the invention also shown in FIGS. 3, 6, and 7.

FIG. 8 illustrates a detail view of a subsection of an embodiment of the invention also shown in FIGS. 3, 6, and 7. Tie rod 332 extends from material handling groove 330 of feed bed 103 across cutting bed 509 where it is cut by cutting tool 800. The cut end rests across cutting bed 509 and onto the upper portion protective wheel guard 704*a*. In this instance, cutting bed 509 is configured as a pair of rollers supporting conduit-formed tie-rod 332 the ends of which are mounted into cutting assembly housing 703. Cutting tool 800 is mounted on cutting tool mount 801 which is supported in cutting tool mounting arm 702 of cutting assembly 506. Cutting tool assembly is protected from operator interference by shield 701. Handle 802 is mounted to shield 701. Handle 802 is further secured into place by handle securing mechanism 803 which is mounted to cutting assembly housing 703. Thus, the shield cannot be accidentally removed without first positively disconnecting it from a secure mount.

Figure 9:
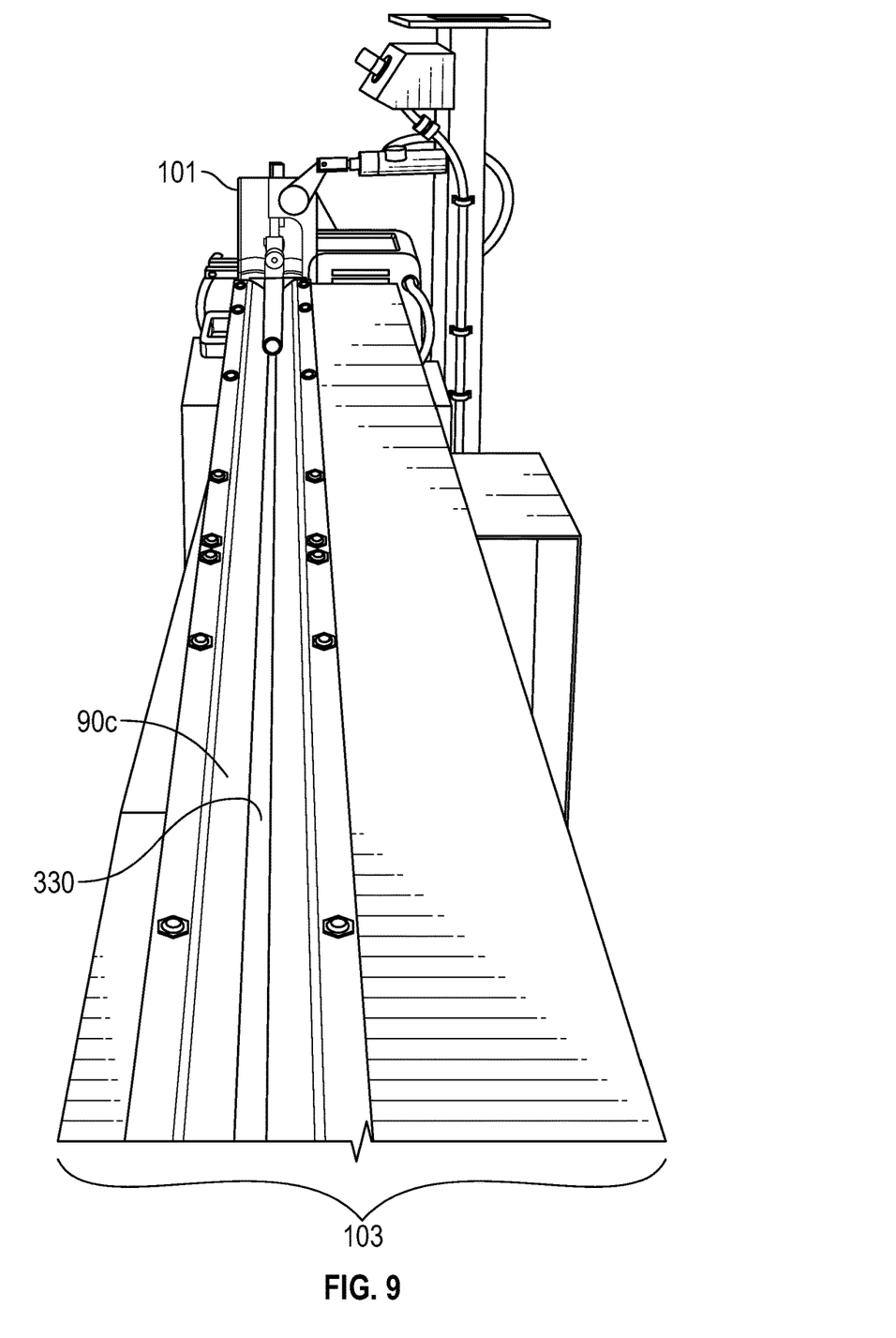
FIG. 9 illustrates a detail view of a subsection of an embodiment of the invention.

FIG. 9 illustrates a detail view of a subsection of an embodiment of the invention. Feed bed 103 contains material handling groove 330 with material handling groove walls 900 mounted to feed bed 103. Material handling groove walls 900 may be removed from feed bed 103 and new walls configured to support the same or a different style of tie rod inserted and secured to feed bed 103. In operation, a tie rod supported in material handling groove 330 formed by material handling groove walls 900 is driven towards cutting and polishing assembly 100 by material feeder 331 (not shown). Those skilled in the art can readily appreciate that the ability to change out groove walls 900 increases the value of the machine to operators as a multiplicity of tie-rod types may be used without having to purchase a wholly separate machine. Further, replacement costs are held to a minimum as the need to exchange a high-wearing component is limited to the walls and not an entire apparatus.

Figure 10:
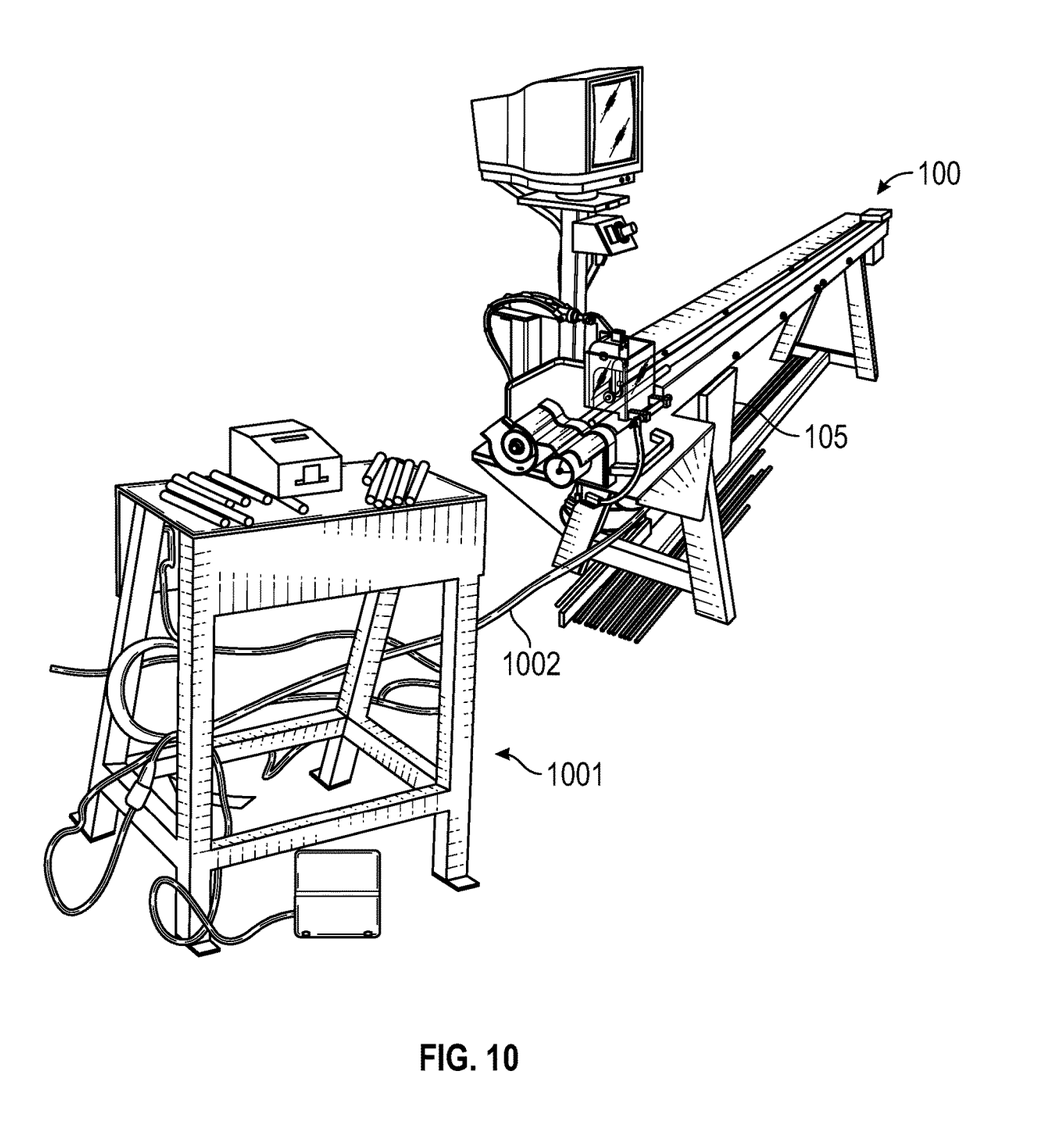
FIG. 10 illustrates an offset overview of an embodiment of the invention.

FIG. 10 Illustrates an offset overview of an embodiment of the invention. Tie rod apparatus 100 is connected to an accessory device 1001 via an accessory interlink 1002 connected to command and power module 105. Accessory device 1001 may be any of a number of tools such as sanders, grinders, polishers in addition to bending, seaming, and beading equipment by way of non-limiting example. Accessory device 1001 may be configured to provide and/or receive further inventory tracking and data information to command and power module 105 and/or user interface module 108.

Figure 11:
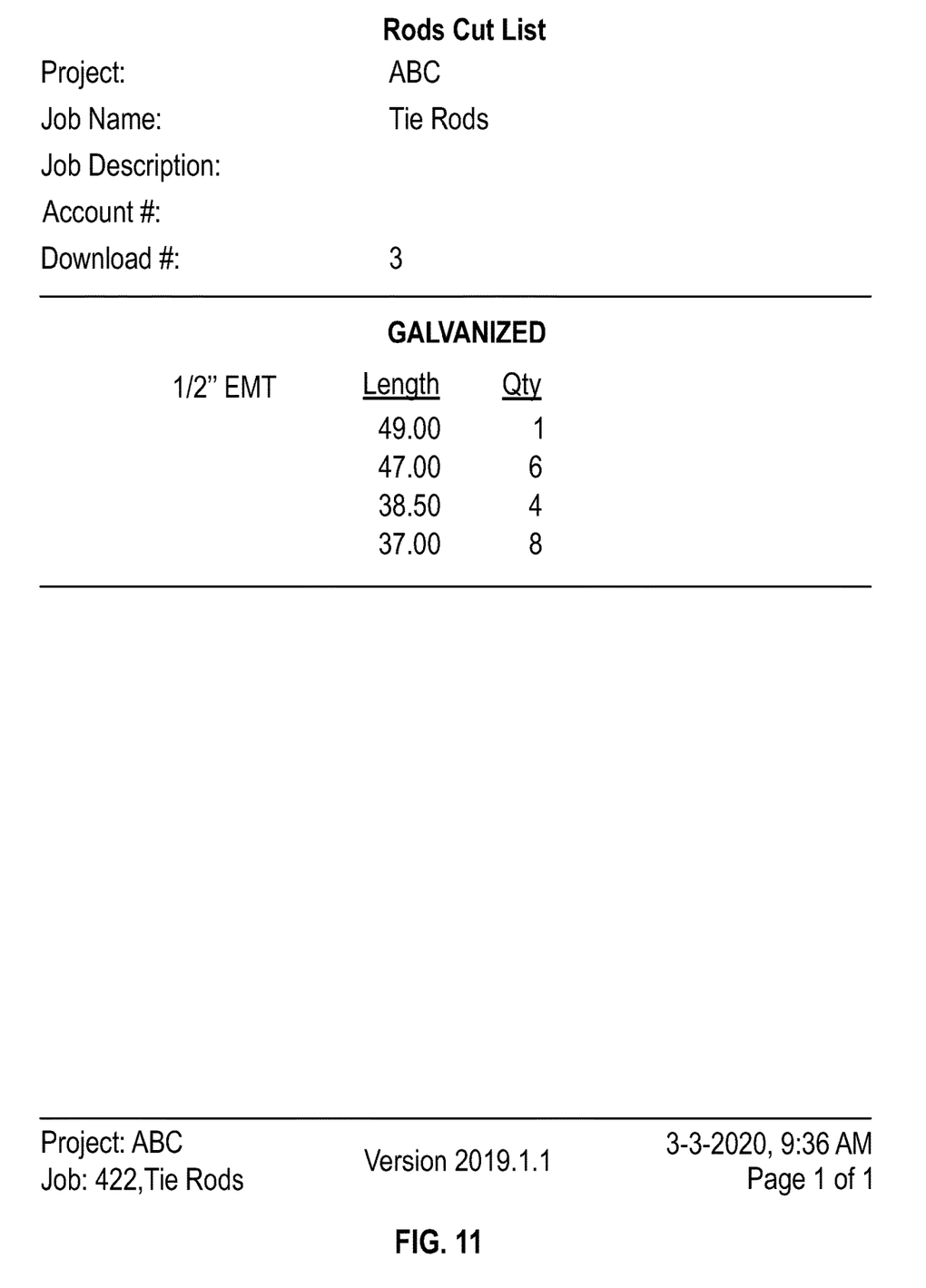
FIG. 11 illustrates an example cut list.

FIG. 11 illustrates an example cut list. Such information on the list includes material type, material finish type, desired lengths and quantities, project name, job name, job description, billing information such as account number, and version number. Such a cut list may be displayed on display device 109 and generated either internally in response to user inputs or externally through the usage of CAD/CAM programs and delivered either via non-transitory computer readable media or from a remote device.

Finally, the written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A tie rod forming apparatus, comprising:
a frame, said frame supporting a material holding unit for releasably holding tie rod stock material;
a feed bed in structural communication with said material holding unit, said feed bed selectively accepting and manipulating said tie rod stock material;
a cutting assembly in operative communication with said feed bed;
an operator interface module in communication with said material holding unit and said cutting assembly;
a polishing and deburring assembly in operative communication with said cutting assembly; and wherein said material holding unit selectively dispenses said tie rod stock material to said feed bed, and said cutting assembly manipulates a portion of said dispensed tie rod stock material, in dependence upon parameters communicated by said operator interface module.

2. The tie rod forming apparatus according to claim 1, wherein:
said cutting assembly includes at least one of a disc cutter, saw, plasma arc, welding torch, and water jet.

3. The tie rod forming apparatus according to claim 1, wherein:
said tie rod stock material includes an elongated metal rod.

4. The tie rod forming apparatus according to claim 1, wherein:
said parameters include features to be defined in said tie rod stock material, via said cutting assembly.

5. A tie rod forming apparatus for manipulating tie rod stock material into discrete tie rods in relation to a predetermined design, said tie rod forming apparatus comprising:
a frame supporting a material holding unit for releasably holding a quantity of said tie rod stock material;
a feed bed located beneath said material holding unit, said feed bed selectively accepting and manipulating said tie rod stock material dispersed from said material holding unit;
a cutting assembly in operative communication with said feed bed;
an operator interface module in communication with said material holding unit and said cutting assembly;
wherein said material holding unit selectively dispenses said tie rod stock material to said feed bed, and said cutting assembly manipulates a portion of said dispensed tie rod stock material to form said discrete tie rods, in dependence upon parameters of said predetermined design and as communicated by said operator interface module; and
wherein said dispersal of said tie rod stock material from said material handling unit is gravity assisted.

6. The tie rod forming apparatus according to claim 5, wherein:
said cutting assembly includes at least one of a disc cutter, saw, plasma arc, welding torch, and water jet.

7. The tie rod forming apparatus according to claim 5, wherein:
said tie rod stock material includes a quantity of elongated metal rods.

8. The tie rod forming apparatus according to claim 5, wherein:
said parameters include features to be machined in said tie rod stock material, via said cutting assembly.

9. A method of manipulating tie rod stock material, said method comprising the steps of:
forming a material holding unit for releasably holding said tie rod stock material;
placing a feed bed beneath said material holding unit, said feed bed selectively accepting and manipulating said tie rod stock material;
positioning a cutting assembly in operative communication with said feed bed;
providing an operator interface module in communication with said material holding unit and said cutting assembly, said operator interface module selectively receiving design parameters;
releasing a predetermined quantity from said tie rod stock material to said feed bed, utilizing in part gravity assist; and
communicating said released tie rod stock material to said cutting assembly for processing in accordance with said design parameters.

* * * * *